Sept. 20, 1927.

P. GARDNER

BIAS CUTTING MACHINE

Filed Aug. 13, 1926

WITNESSES

INVENTOR
Percy Gardner
BY
ATTORNEYS

Sept. 20, 1927.
P. GARDNER
1,643,157
BIAS CUTTING MACHINE
Filed Aug. 13, 1926    4 Sheets-Sheet 2
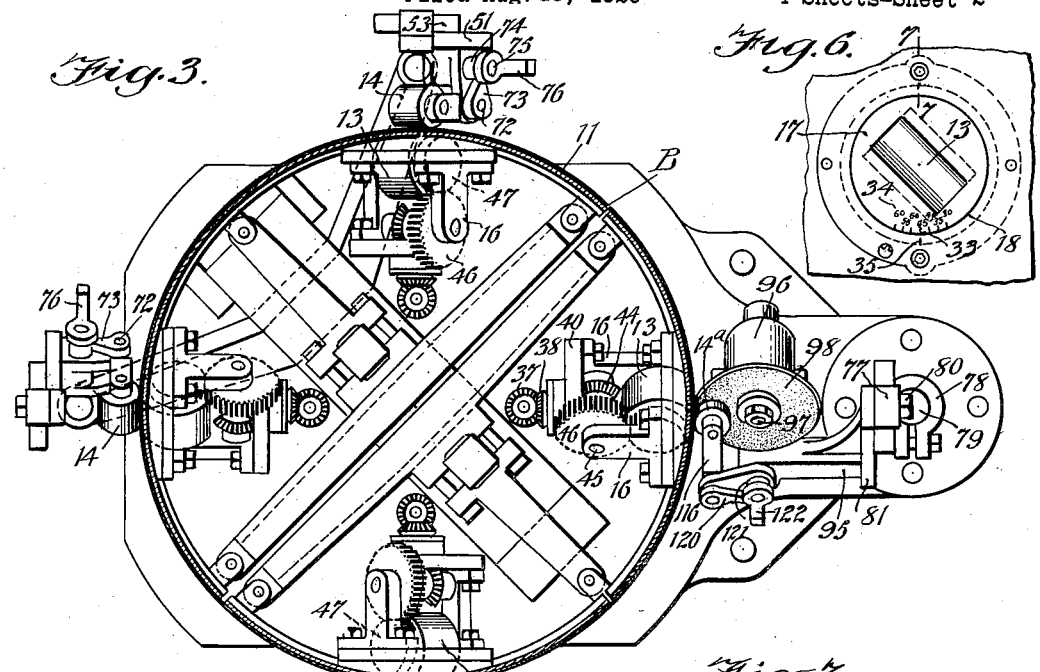
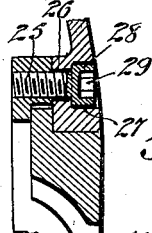
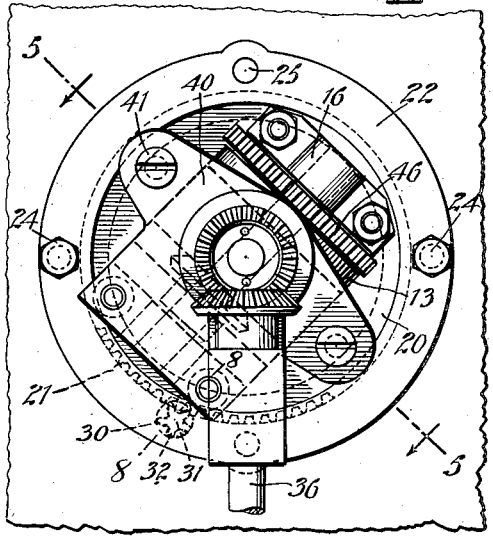
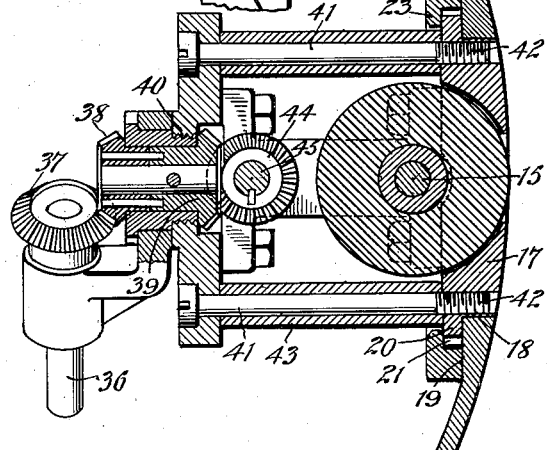
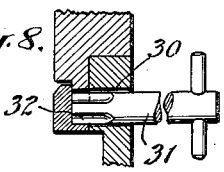
WITNESSES
INVENTOR
*Percy Gardner*
BY
ATTORNEYS Sept. 20, 1927.  
P. GARDNER  
1,643,157  
BIAS CUTTING MACHINE  
Filed Aug. 13, 1926   4 Sheets-Sheet 3

WITNESSES

INVENTOR
*Percy Gardner*
BY
ATTORNEYS

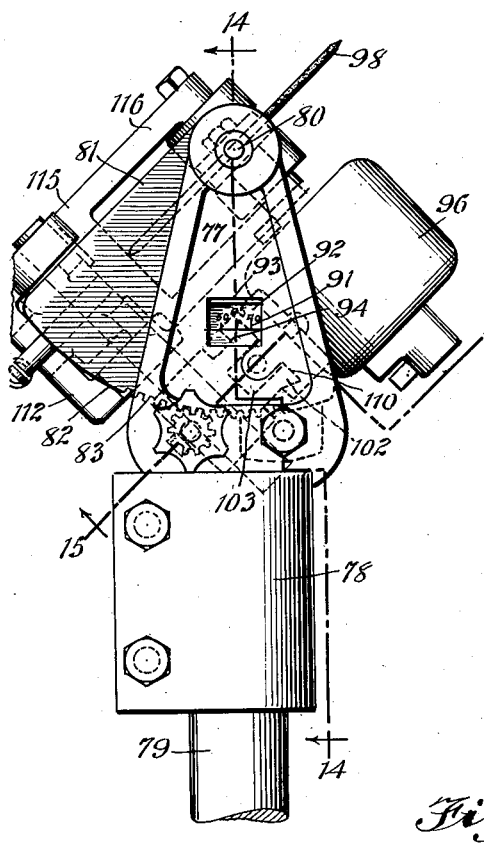

Patented Sept. 20, 1927.

1,643,157

UNITED STATES PATENT OFFICE.

PERCY GARDNER, OF EAST ORANGE, NEW JERSEY, ASSIGNOR TO H. M. BUNKER & CO., INC., OF NEW YORK, N. Y., A CORPORATION OF NEW YORK.

BIAS-CUTTING MACHINE.

Application filed August 13, 1926. Serial No. 129,012.

This invention relates to a machine for cutting strips spirally from tubular fabrics or textile materials whereby the strips thus produced will be on a bias to the weave of the fabric, and the invention is in the nature of an improvement over my prior United States Patent No. 1,581,051, granted April 13, 1926.

Bias fabrics are usually produced with the weave of the material disposed approximately at an angle of 45° but in some instances it is desirable to produce the material in such a manner as to have the weave at an angle of more or less than 45°. In my prior patent no provision was made for cutting the strips in such a manner as to vary the degree of angularity of the bias, and the present invention therefore aims as its principal object to provide means whereby the angularity of the cutting and feeding mechanisms may be adjusted to produce bias cloth having the weave at various angles.

The invention furthermore comprehends in a bias cutting machine, means for indicating and gaging angular adjustments of the cutting and feeding mechanisms.

The invention furthermore comprehends an adjustable bias cutting machine which is comparatively simple in its construction and mode of use, which is economical to produce and operate, and which is thoroughly reliable and highly efficient in its purpose.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Fig. 3 is a horizontal sectional view on an enlarged scale taken approximately on the line indicated at 3—3 in Fig. 1;

Fig. 4 is a fragmentary inner face view of a portion of the upper end of the mandrel illustrating one of the adjustable inner feed roller supports and the driving connection thereto;

Fig. 5 is a fragmentary detail sectional view illustrating one of the inner feed rollers, its support and driving mechanism;

Fig. 6 is a fragmentary external view of one of the feed rollers and its support;

Fig. 7 is a fragmentary detail sectional view illustrating the means for clamping one of the inner feed roller supports in adjusted position, the same being taken approximately on the line indicated at 7—7 in Fig. 6;

Fig. 8 is a fragmentary detail sectional view of the means for effecting an adjustment of one of the inner feed roller supports, the same being taken approximately on the line indicated at 8—8 in Fig. 4;

Fig. 13 is a detail view of the cutting mechanism, its support and adjusting means;

Fig. 14 is a sectional view therethrough taken approximately on the line 14—14 of Fig. 13;

Fig. 15 is a similar view taken approximately on the line 15—15 of Fig. 13.

Figures 1, 2:
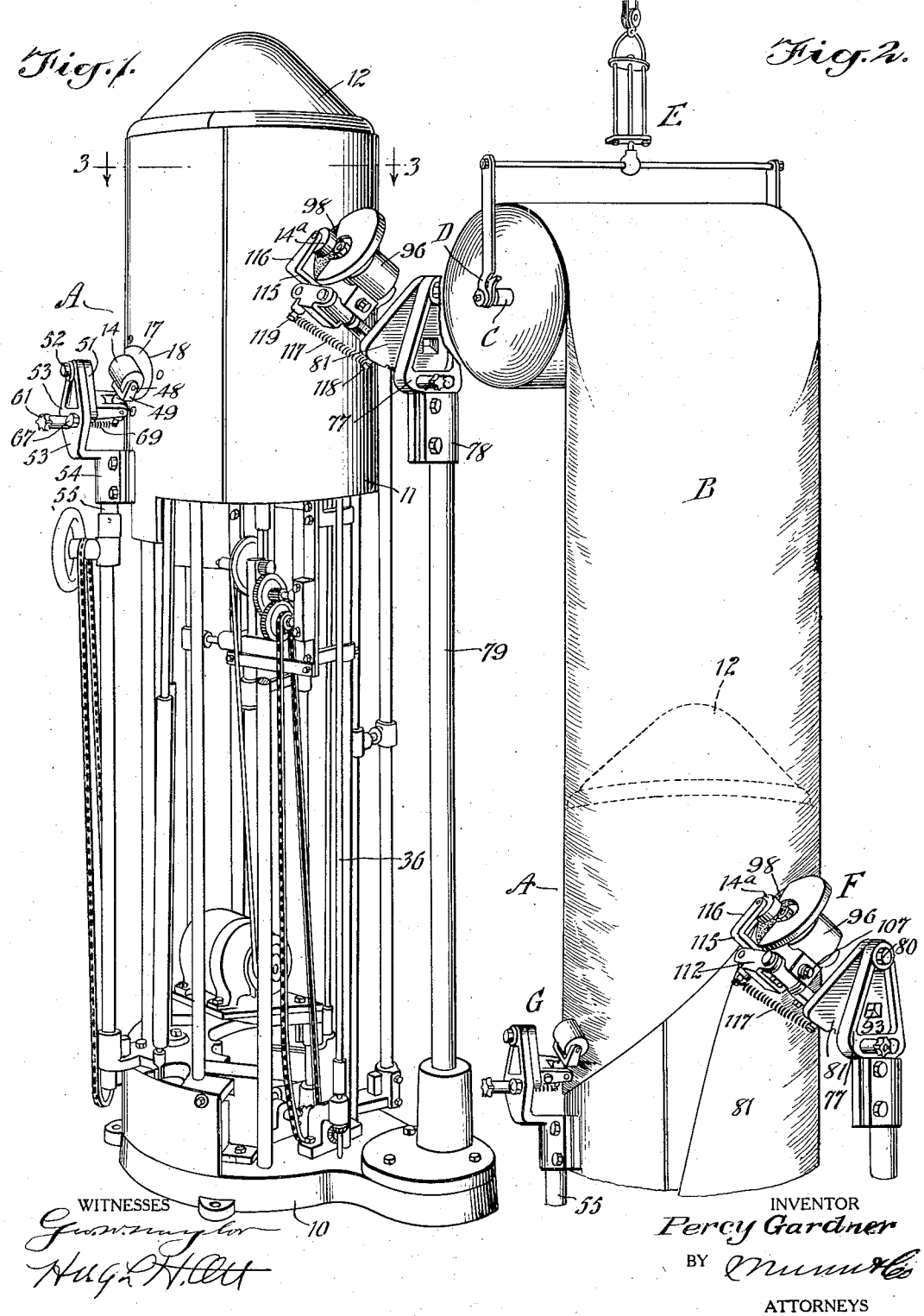
Figure 1 is a perspective view of the improved machine with parts of the casing or housing removed.
Fig. 2 is a fragmentary perspective view of the machine illustrating the tubular material in feeding relation to the cutting and feeding mechanisms.
Figure 9:
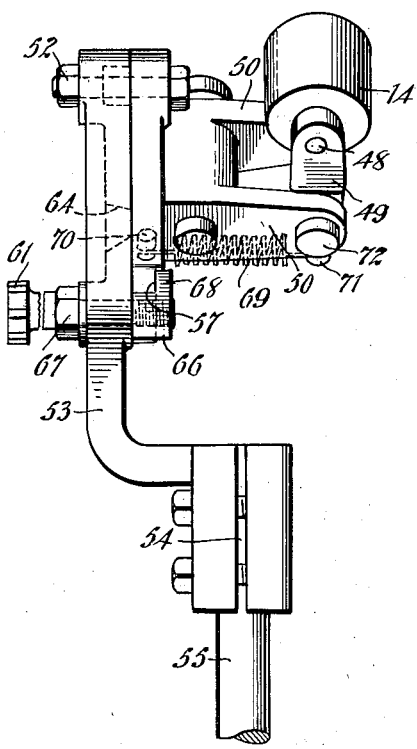
Fig. 9 is a detail side view of one of the adjustable outer pressure rollers, its mounting and adjusting means.
Figure 10:
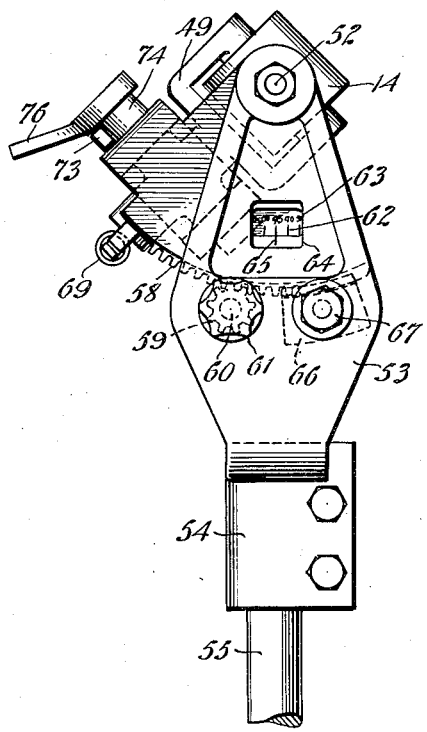
Fig. 10 is a face view thereof.
Figure 11:
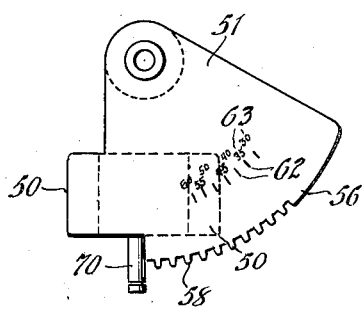
Fig. 11 is a detail face view of one of the segmental plates upon which the outer pressure rollers are mounted.

Referring to the drawings by characters of reference, the bias cutting machine includes broadly a mandrel member A which is adapted to have spirally fed thereover the tubular cloth B, which cloth or material is preferably rolled upon a core or shaft C. The core or shaft C is mounted for rotation in the bearings D of a swiveled supporting element E, whereby to permit of the unrolling of the fabric and relative turning of the same with respect to the mandrel A during the feeding operation.

The machine further includes broadly a cutting mechanism F, and a feeding mechanism G which is carried by the mandrel member A, engages the inner and outer faces of the material at substantially spaced points, and exerts an annular pull thereon to effect a spiral feeding of the same from the roll over the mandrel and with respect to the cutting mechanism.

The mandrel A includes a base 10, a substantially tubular body 11, and a substantially conical upper end 12. The feeding mechanism includes a plurality of circumferentially spaced positively driven inner feed rollers 13 and a corresponding number of co-acting outer pressure rollers 14, to respectively engage with the inner and outer faces of the material.

The inner feed rollers 13 are each keyed to a shaft 15, which shafts are journaled in bearing brackets 16 bolted, or otherwise secured to a turntable 17. The turntable 17 is in the nature of a circular plate fitted in a circular opening 18 in the mandrel body with the outer face of the turntable disposed approximately flush with the periphery of and with the inner end extending beyond the inner periphery of the mandrel body 11. On its side at this point, the mandrel body is provided with a flat face 19, and the turntable is provided at the inner projecting end with a laterally enlarged flange 20 having peripheral gear teeth 21. In order to maintain the turntable within the opening 18 against inward axial displacement, an annulus 22 is provided which is of angle shape in cross section and presents at its innermost end an inwardly projecting bead 23, whereby the annulus loosely fits around the turntable flange 20 to allow for rotation or turning movement thereof relative to the mandrel body. The annulus is connected at diametrically opposite points to the inner flattened face 19 of the mandrel body by stud bolts 24 which are anchored to the mandrel body and which loosely maintain the annulus in place. In order to further assist in maintaining the annulus in place, and, at the same time, to afford means for clamping the bead 23 against the flange 20 of the turntable to frictionally lock the flange 20 against the face 19 of the mandrel so as to prevent rotation of the turntable after the same is adjusted, a pair of clamping screws 25 are employed, which screws have the shanks threadingly engaging the annulus. The outer ends of the screw shanks are loosely mounted in apertures 26 in the mandrel body, which apertures 26 communicate with enlarged recesses 27 in the outer periphery of the mandrel body. The screws are formed with enlarged heads 28 fitting into the recesses 27 and the heads are formed with sockets 29 to receive a suitable wrench for turning the same, it being understood that the heads are completely countersunk below the periphery of the mandrel body so as to prevent interference with the material being fed thereover. The mandrel body adjacent each turntable is formed with an opening or passageway 30, the periphery of which opening or passageway approximately coincides with the inner end of the gear teeth 21 so that a key 31 having gear teeth 32 may be inserted through the opening or passageway to engage with the gear teeth 21 for effecting turning movement of the turntable to adjust the angular disposition of the inner feed rollers 13. In order to gage and facilitate the proper setting of the rollers 13, the turntable on its exterior face and adjacent its periphery is provided with radial graduations 33 having indicia 34 relating thereto, while the mandrel adjacent the opening 18 is formed with a single mark or graduation 35 to permit gaging of the degree of angularity of the inner feed rollers.

In order to establish a positive driving connection between the driving shaft 36 and the feed roller 13 while permitting of adjustment of the angularity of the roller, a beveled gear 37 keyed to the upper end of the shaft meshes with a beveled pinion 38 secured to a beveled gear 39, the beveled pinion and gear 38 and 39 being mounted in a bearing 40, which bearing 40 is supported from the turntable by one of the bearing brackets 16 and by a pair of bolts 41 which are threadedly anchored at 42 in the turntable, spacing sleeves 43 being interposed between the turntable and the bearing 40. The beveled gear 39 meshes with a beveled pinion 44 which is keyed to a shaft 45 journaled in the bearing bracket 16. The shaft 45 has also keyed thereto a gear 46, which meshes with a pinion 47 on the roller shaft 15. Under this arrangement it is obvious that the rollers 13 while positively driven are provided with driving connection which permits of relative angular adjustments of the rollers.

The outer pressure rollers 14 will now be described with the exception of the one located adjacent the cutting mechanism F and designated by the reference character 14ª, which will be separately treated hereinafter due to the fact that it is mounted in a slightly different manner, although functioning in the same capacity. These pressure rollers 14 are each carried by a shaft 48 mounted in a forked bearing element 49, which bearing element in turn is swingably journaled between the furcations or arms 50 provided on a segmental plate 51. The segmental plate is in turn fulcrumed by a pivot 52 to a bracket 53 rotatably mounted by a clamp 54 on the upper end of a vertical rod 55. The arcuate edge 56 of the segmental plate 51 is formed with a rabbetted portion 57 on its inner face and is provided with peripheral rack or gear teeth 58 with which a gear or pinion 59 meshes. The gear or pinion is keyed to a shaft 60 which extends outwardly through the bracket 53 and is provided at its outer end with a manipulating knob 61 which is adapted upon rotation to impart swinging movement to the segmental plate for changing the angularity of the pressure rollers. In order to accurately engage the angularity of the pressure rollers so that each of the same may be set to coincide with each other and with the setting of the feed rollers, the segmental plate is formed with graduations 62 and indicia 63 relating thereto while the bracket is formed with an aperture 64 through which the graduations and indicia 62 and 63 may be observed, a wall of the aperture having a graduation or mark 65 by which the graduations may be gaged. In order to retain the segmental plate in an adjusted or set position, a clamping block 66 is movable toward and away from the inner face of the bracket 53 by means of a set screw 67, the said clamping block having an overhanging lip 68 which engages with the rabbetted portion 57.

Figure 12:
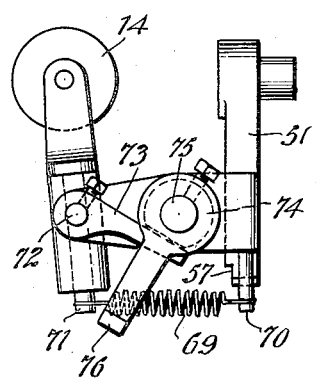
Fig. 12 is a detail edge view thereof with the pressure roller mounted thereon and illustrating the plate removed from the supporting bracket.

In order to normally swing the bearing element 49 of the roller to dispose the roller bearing in normal active frictional contact with the outer face of the fabric, a coiled contractile spring 69 has its opposite ends respectively connected with a stem 70 on the segmental plate and a stem 71 on the lower end of the bearing element 49. To facilitate the swinging of the pressure rollers 14 outwardly away from the mandrel or out of contact with the outer face of the fabric to permit of the positioning of the fabric on the mandrel or the removal of the same therefrom, the bearing element has its shaft 72, which journals the same in the bearing arms 50, provided with a radially disposed arm 73. The arm 73 at its free end is disposed in the path of movement of a cam 74, which cam is carried by a stud shaft 75 rotatably mounted in the arms 50 and which shaft is further provided with a manipulating lever arm 76. It will be observed, especially as illustrated in Fig. 12, that when the lever arm 76 is swung from the normal position illustrated in Fig. 12, the bearing element 49 and the pressure roller 14 will be thrown outwardly against the action of the spring 69 and spaced from the periphery of the mandrel.

The cutting mechanism F is mounted on a bracket 77 attached by a clamping device 78 to the upper end of a vertical standard 79 as is the outer pressure roller 14ª. The bracket 77 is fulcrumed thereto on the pivot 80, a segmental plate 81, which is similar to the segmental plates 51, and has provided on its arcuate lower edge 82, rack teeth 83 engaged by a pinion 84 keyed to a stud shaft 85 which extends outwardly through the bracket 77 and has secured to its outer end a manipulating knob 86 to impart upon turning movement of the knob, a swinging or adjustment of the segmental plate. A clamp block 87 movable toward or away from the inner face of the bracket 77 by a screw 88, is formed with an overhanging lip 89 which engages the rabbetted portion 90 of the segmental plate for clamping or releasing said plate after its adjustment. The segmental plate on its outer face is provided with graduations 91 and indicia 92 relating thereto, while the bracket 77 is formed with an aperture 93 through which the graduations and indicia are visible, one wall of the aperture having a mark or graduation 94 for gaging the graduation 91 with respect thereto. This indicates the angular position of the cutting mechanism and the pressure roller 14ª. The segmental plate 81 is provided with an inwardly projecting bracket arm 95 upon which a motor 96 is mounted for adjustment toward and away from the periphery of the mandrel. The motor shaft 97 has secured thereto a cutting wheel or disk knife 98. The specific mounting means for the motor consists of a transverse non-rotary shaft 99 projecting from opposite sides of the bracket arm 95 and upon which a supporting member 100 is mounted to permit of tilting adjustment. A set screw 101 is threaded through the supporting member 100 and engages with the shaft 99 to maintain the member 100 in tiltedly adjusted positions. The member 100 is provided with an upstanding dove-tailed rib 102 having a central recess 103 extending from one end of the rib to a point adjacent the opposite end, the non-recessed end 104 having a bearing aperture 105 in which a jack screw 106 is swiveled, the jack screw having a manipulating head 107. The motor base 108 is attached to a slide 109 which is formed with a dovetailed recess fitting the dovetailed rib 102. The slide is provided with a medial depending lug 111 which is formed with a threaded aperture engaged by the jack screw 106, which upon rotation shifts the motor and cutting knife toward and away from the mandrel. The bracket arm 95 further supports a yoke 112 which straddles the bracket arm and is supported by the shaft 99. The yoke 112 has pivoted thereto on a pivot shaft 113, a bearing element 114 having a bifurcated upper end 115, the furcations 116 of which are disposed on opposite sides of the cutting knife 98 adjacent the bearing point which engages and cuts the fabric. These furcations rotatably support on opposite sides of the cutting knife, the pressure rollers 14ª, which maintain the fabric impinged against the inner driving roller 13. The pressure rollers 14ª are normally impinged and maintained against the fabric by means of a coiled contractile spring 117 the opposite ends of which are respectively engageable with a depending lug 118 on the lower end of the bearing element 114 and a depending stem 119 on the segmental plate 81. The means for swinging the bearing element 114 against the action of the spring 117 to dispose the pressure rollers 14ᵃ in outwardly spaced relation to the mandrel, consists of a radial arm 120 secured to the pivot shaft 113 and a cam 121 engageable with the arm, having a manipulating handle 122.

Under this construction and arrangement, it is obvious that a bias cutting machine has been devised in which the cutting and feeding mechanisms are angularly adjustable to produce bias strips having the weave of the material at varying degrees of angularity. In effecting adjustments, the operator independently adjusts each of the inner pressure rollers and the outer pressure rollers 14, while the pressure rollers 14ᵃ and the cutting mechanism are simultaneously adjusted.

What is claimed is:

1. In a bias cutting machine, a stationary mandrel, and material feeding and cutting elements adjustable with respect to the mandrel for varying the degree of angularity of the bias material produced thereby.

2. In a bias cutting machine including a stationary mandrel member over which a tubular material is fed, material feeding and cutting elements independently adjustable with respect to the mandrel member for varying the degree of angularity of the bias material produced.

3. In a bias cutting machine including a stationary mandrel member over which a tubular material is fed, angularly adjustable material feeding and cutting elements for varying the degree of angularity of the weave of the material produced with respect to the edges of the strip.

4. In a bias cutting machine including a stationary mandrel member over which a tubular material is fed, angularly adjustable material feeding and cutting elements for varying the degree of angularity of the weave of the material produced with respect to the edges of the strip, and means for gaging the angularity of the adjustments of the feeding and cutting elements.

5. In a bias cutting machine including a stationary mandrel member over which a tubular material is fed, mechanisms for feeding the material and cutting a strip spirally therefrom, said mechanisms including angularly adjustable material engaging and feeding elements and material cutting means whereby to vary the angularity of the bias strip thus produced.

6. In a machine for cutting a strip spirally from a tubular fabric, whereby to produce a fabric strip on the bias to the weave of the same, a mandrel over which one end of the fabric is initially positioned, inner driven and outer idler pressure rollers associated with the mandrel for engaging the inner and outer surfaces of the tubular material to feed the same longitudinally and rotatably over the mandrel, and a cutter means tangentially engaging the fabric and disposed at an angle with respect thereto for severing the same on a spiral line during the feeding operation, the said driven and pressure rollers and cutting means being mounted for angular adjustment to vary the degree of angularity of the bias material produced.

7. In a machine for cutting a strip spirally from a tubular fabric, whereby to produce a fabric strip on the bias to the weave of the same, a mandrel over which one end of the fabric is initially positioned, inner driven and outer pressure rollers associated with the mandrel for engaging the inner and outer surfaces of the tubular material to feed the same longitudinally and rotatably over the mandrel, and a cutter means tangentially engaging the fabric and disposed at an angle thereto for severing the same on a spiral line during the feeding operation, the said driven and pressure rollers and cutting means being independently adjustable for varying the degree of angularity of the bias strip thus produced.

8. In a machine for cutting a strip spirally from a tubular fabric, whereby to produce a fabric strip on the bias to the weave of the same, a mandrel over which one end of the fabric is initially positioned, inner driven and outer idler pressure rollers associated with the mandrel for engaging the inner and outer surfaces of the tubular fabric to feed the same longitudinally and rotatably over the mandrel, a cutter means tangentially engaging the fabric and disposed at an angle with respect thereto for severing the same on a spiral line during the feeding operation, the said driven and pressure rollers and cutting means being mounted for angular adjustment to vary the degree of angularity of the bias material produced, and means for gaging the angular adjustments of the feeding and pressure rollers and the cutting means.

9. A bias cutting machine for tubular materials, comprising a vertically disposed mandrel over which the tubular material is adapted to be fed from an overhead supply, angularly adjustable means for spirally feeding the same from the overhead supply over the mandrel, and an angularly adjustable cutting element for cutting a spiral strip from said material, said feeding means and cutting element including means for varying the angular adjustments thereof.

10. In a machine for cutting a strip spirally from a tubular fabric, whereby to produce a fabric strip having a weave at an angle to the side edges of the strip, a mandrel over which one end of the tubular fabric is initially positioned, inner driven rollers and outer pressure rollers associated with the mandrel and disposed at an angle for engaging the inner and outer surfaces of the tubular fabric to feed the same spirally over the mandrel, a cutter means tangentially engaging the fabric and disposed at an angle thereto for severing the same on a spiral line during the feeding operation, means for supporting the inner driven rollers to permit of relative angular adjustments thereof with respect to the mandrel, means for supporting the outer pressure rollers to permit of angular adjustments relative to the mandrel, and means for supporting the cutter means to permit of angular adjustments thereof whereby variations in the degree of angularity of the weave of the material with respect to the edges of the strip may be accomplished.

11. In a machine for cutting a strip spirally from a tubular fabric, whereby to produce a fabric strip having a weave at an angle to the side edges of the strip, a mandrel over which one end of the tubular fabric is initially positioned, inner driven rollers and outer pressure rollers associated with the mandrel and disposed at an angle for engaging the inner and outer surfaces of the tubular fabric to feed the same spirally over the mandrel, a cutter means tangentially engaging the fabric and disposed at an angle thereto for severing the same on a spiral line during the feeding operation, means for supporting the inner driven rollers to permit of relative angular adjustments thereof with respect to the mandrel, means for supporting the outer pressure rollers to permit of angular adjustments relative to the mandrel, and means for supporting the cutter means to permit of angular adjustments thereof whereby variations in the degree of angularity of the weave of the material with respect to the edges of the strip may be accomplished, the inner driven feed-roller-supporting means consisting of a circular turntable and a circular apertured portion in the mandrel body in which the same is mounted, a flange having gear teeth formed on the inner end of the turntable, and an apertured portion in the mandrel body for receiving a gear-toothed key to engage the gear-toothed flange whereby to permit of rotary adjustment of the turntable and relative angular adjustments of the inner driven roller supported thereby.

12. In a machine for cutting a strip spirally from a tubular fabric, whereby to produce a fabric strip having a weave at an angle to the side edges of the strip, a mandrel over which one end of the tubular fabric is initially positioned, inner driven rollers and outer pressure rollers associated with the mandrel and disposed at an angle for engaging the inner and outer surfaces of the tubular fabric to feed the same spirally over the mandrel, a cutter means tangentially engaging the fabric and disposed at an angle thereto for severing the same on a spiral line during the feeding operation, means for supporting the inner driven rollers to permit of relative angular adjustments thereof with respect to the mandrel, means for supporting the outer pressure rollers to permit of angular adjustments relative to the mandrel, and means for supporting the cutter means to permit of angular adjustments thereof whereby variations in the degree of angularity of the weave of the material with respect to the edges of the strip may be accomplished, the means for supporting the outer pressure rollers and the cutter means consisting of brackets, segmental plates pivoted thereto for swinging movement, having rack teeth, and pinion means engaging the rack teeth for swinging the segmental plates, the pressure rollers and the cutter means being supported by the segmental plates.

PERCY GARDNER.